Dec. 9, 1969  J. E. COX ET AL  3,483,072
PROCESS FOR PRODUCING GLASS COATED BERYLLIUM
FIBERS AND RESULTING PRODUCTS
Filed Nov. 22, 1966
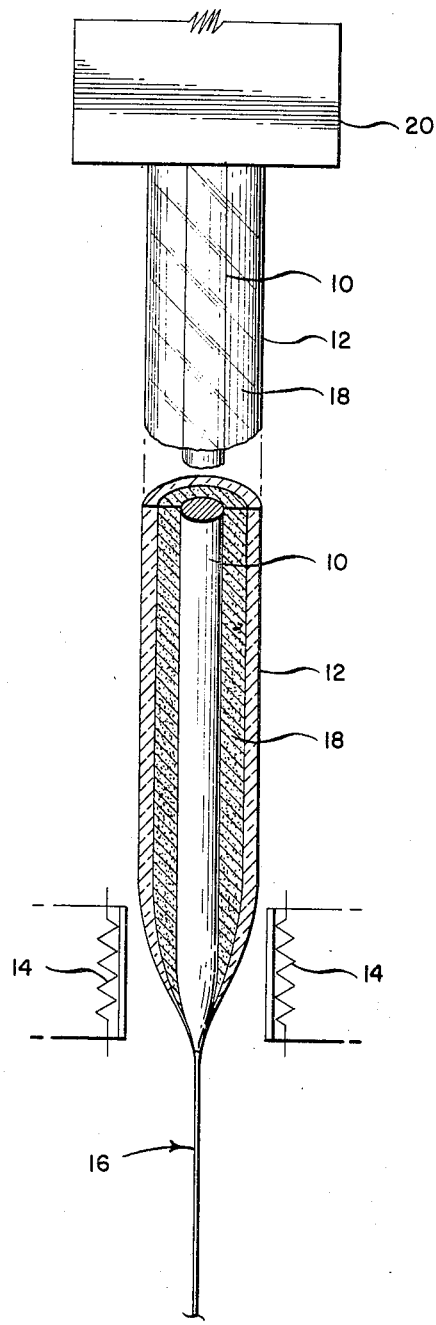
INVENTORS
JOHN E. COX
RICHARD D. VELTRI
BY *Finnegan & Henderson*
ATTORNEYS United States Patent Office 3,483,072
Patented Dec. 9, 1969

3,483,072
PROCESS FOR PRODUCING GLASS COATED BERYLLIUM FIBERS AND RESULTING PRODUCTS
John E. Cox, Glastonbury, and Richard D. Veltri, East Hartford, Conn., assignors to United Aircraft Corporation, East Hartford, Conn., a corporation of Delaware
Filed Nov. 22, 1966, Ser. No. 596,242
Int. Cl. D02g 3/38; C03c 3/04
U.S. Cl. 161—175                                 9 Claims

ABSTRACT OF THE DISCLOSURE

A process is provided for the preparation of beryllium fibers in which a fiber-forming glass tube is drawn into a continuous glass fiber which contains as its core a continuous beryllium filament. A protective glass composition is disposed between the outer glass tubing and the beryllium to allow formation of the filament of the reactive beryllium metal. This protective glass composition contains at least 50 mol percent silica, 12 to 30 mol percent beryllium oxide, and balance metal fluxing agents.

---

This invention relates to the production of fibers or filaments of reactive metals. More particularly, it relates to a process for casting filaments of reactive metals as the core material of glass-metal composite fibers, and to the composite fiber products produced by this process.

The term "reactive metal" is intended to include metals, such as beryllium, which are vigorously reactive with conventional glass compositions when the metals are molten. While the process of this invention is largely described as it is used in the production of beryllium fibers, it is to be understood that it can also be used in the production of fibers of other glass-reactive metals such as aluminum, chromium and the like.

The use of reactive metal fibers, such as beryllium, as reinforcing materials in composite resin or metal structural materials is highly desirable in producing composites having a high strength modulus and a low density. For example, the partial or complete substitution of beryllium fibers for reinforcing glass fibers in structural matrixes can be used to produce strong lightweight structural composites. Such structural materials can suitably be used in the production of aircraft, helicopter blades, nose cones for space vehicles and the like.

Attempts to utilize lightweight reactive metal fibers have met with little success, however, due to the almost prohibitive cost of producing them by conventional die extrusion techniques and the like. One procedure well known in the prior art for the economical production of nonreactive metal fibers or filaments, such as copper, silver, gold and tin, is the formation of filaments of such metals as the core material of glass-metal composite fibers. By this procedure, a glass tubing containing the desired metal is heated to a temperature sufficient to melt the metal and soften the glass. The outer glass shell is then drawn into a continuous fiber with the metal being continuously cast as a core within the glass fiber.

Prior art attempts to economically produce beryllium and other reactive metal fibers by this process have proven largely unsuccessful due to the vigorous reaction that occurs between molten reactive metal, such as molten beryllium, and the constituents, notably silica, of the outer glass shell. This reaction effectively destroys the fiber-forming process, and renders it completely ineffective for the production of reactive metal fibers.

Accordingly, it is a primary object of this invention to provide a new and improved process for the production of filaments or fibers of reactive metals in which such metals are cast as the core of a glass-metal composite fiber.

Another object of this invention is to provide an economical process for the production of filaments of reactive metals, such as beryllium, which allows the utilization of established techniques and existing equipment that have been heretofore utilized in the production of filaments or fibers of nonreactive metals.

Still another object of this invention is to provide a process for the production of reactive metal filaments by casting these metals as the core of a glass-metal composite fiber while inhibiting any reaction between the reactive metal core and the outer glass shell in which the metal filament is formed to the extent necessary to allow the production of good quality fibers.

A still further object of this invention is to provide a process for the production of filaments or fibers from reactive metals, such as beryllium, by casting the molten metal as the core of a glass-metal composite fiber while inhibiting reaction between the molten reactive metal and the outer glass shell in which the metal fiber is formed by providing a protective layer between the molten metal core and the outer glass shell.

A still further object of this invention is to provide a reactive metal fiber, such as beryllium fiber, which is cast as the core of a composite glass-metal fiber.

Additional objects and advantages of this invention will be set forth in part in the description which follows, and in part will be obvious from the description, or may be learned by the practice of the invention, the objects and advantages being realized and attained by means of the methods, processes, products and combinations, particularly pointed out in the appended claims.

To achieve the foregoing objects and in accordance with its purpose, as embodied and broadly described, the reactive metal fiber preparation process of this invention comprises inserting a reactive metal into a glass tubing, and surrounding the reactive metal with a protective glass composition which is compatible or substantially unreactive with the metal and has a flow temperature at or below the melting point. It will be appreciated that glass does not have a definite "melting point" but becomes fluid, or less and less viscous, with increasing temperature. The "flow temperature" of the protective glass composition thus is that temperature at which the glass becomes sufficiently fluid to flow readily.

The metal-glass composite is heated to a temperature at least equal to the fiberizing temperature of the outer glass tubing, and above the melting point of the reactive metal and the flow temperature of the protective glass composition, and the outer glass tubing is then drawn into a continuous glass fiber. The molten reactive metal and molten protective glass composition flow into the outer glass fiber as it is drawn, and the resulting glass fiber contains as its core a continuous filament of the reactive metal, which has been formed within a layer of the protective glass composition.

The invention lies in the novel methods, processes, articles, products, compositions and improvements shown and described. The accompanying drawing which is incorporated in and constitutes a part of this specification, illustrates one embodiment of the invention and, together with the description, serves to explain the principles of the invention.

The drawing is a diagrammatic illustration of the reactive metal fiber production process of this invention.

It is to be understood that both the foregoing general description and the following detailed description are exemplary and explanatory but are not restrictive of the invention.

Reference will now be made in detail to the present preferred embodiment of the invention, an example of which is illustrated in the accompanying drawing.

The process of this invention as illustrated in the drawing is carried out by inserting a reactive metal rod or wire 10, such as beryllium, into glass tubing 12, surrounding rod 10 with a particulate protective glass composition 18, and then heating and drawing this composite into the desired glass-metal fiber product.

The composite is heated to the fiberization temperature of the outer glass shell in open furnace 14 illustrated schematically in the drawing. The heating can be carried out in a partially closed furnace if atmosphere control is necessary. As the glass tubing reaches its fiberization temperature, it is drawn by any suitable fiber drawing means (not shown), such as a rotating drum, to produce a fiber of the desired size. The fiber product, generally indicated as 16, is a composite fiber having a glass outer shell and a beryllium or other reactive metal core.

During the casting of the molten reactive metal as a filamentary core within the composite fiber 16, the molten beryllium is surrounded by a molten protective layer formed from granular protective glass composition 18. This protective glass composition surrounds the molten reactive metal to insulate it from the outer glass shell during fiberization.

In a preferred embodiment of the invention, glass tubing 12 is continuously fed to furnace 14 by a suitable feeder mechanism diagrammatically represented by box 20. Feed mechanism 20 may serve a multiple function of feeding glass tubing 12, beryllium wire 10 and protective glass composition 18, or each of these materials may be supplied by separate feeding mechanisms (not shown).

Although the beryllium or other reactive metal can be supplied in any desired form, it is preferably introduced into glass tubing 12 in the form of a rod or wire having a diameter of about 0.030 to 0.060 inch. This rod or wire should be of high purity beryllium, i.e., about 99% purity, although beryllium or other reactive metals containing various impurities, or even alloys of reactive metals can be treated in accordance with this process.

The outer glass tube 12 used in the process of this invention can be of any conventional fiber-forming glass composition having a fiberizing temperature above the melting point of beryllium (M.P. 1,285±15° C.) or the other reactive metal being used. The "fiberizing" temperatures of such glasses are well known in the glass fiber art, and is the temperature at which the particular glass composition selected softens to the extent that fiberization can be achieved by conventional drawing of the glass under suitable tension. Exemplary of the fiber forming glass compositions which can be used as the outer glass tubing in the present process is the high temperature Owens-Corning Glass Co. glass sold under the name "Vycor." This glass has a fiberization temperature of about 1900° C.

It will be appreciated that the particular high temperature glass composition selected for use as the outer glass tubing in the process of this invention is not important, so long as the tubing selected has a suitable fiberizing temperature for use in the present process. Thus, the process is designed to produce metal fibers, such as beryllium fibers, and the outer glass layer of the composite fiber resulting from this process may be removed by suitable means after the process is completed, or the glass layer may be broken or destroyed in use without adversely affecting the structural properties of the beryllium fibers themselves. On the other hand, it may be advantageous to utilize the glass encased reactive metal fibers directly resulting from the present process for various purposes without removing the outer glass shell.

While the size of the outer glass tubing is not critical, tubing having a nominal diameter of about 0.16 to 0.32 inch is generally satisfactory when using a beryllium rod or wire of the preferred size set forth above.

In accordance with the invention the beryllium in the glass tubing is surrounded with a protective glass composition which is compatible or substantially unreactive with molten beryllium and has a flow temperature no greater than the melting point of beryllium. It is generally preferred to feed a granular protective glass composition into the tubing containing the beryllium rod by gravity feed, as shown in the drawing. Packing of the powdered protective glass composition is thus achieved by the forces of gravity, and no tamping down or the like is generally used or necessary.

The protective glass composition 18 used in the process of this invention must become sufficiently fluid to flow either at or below the melting point of beryllium or the other reactive metal used to form the core of the composite glass-metal fiber. If the flow temperature of the protective glass composition is greater than the melting point of the reactive metal, the fluidized metal can flow through the particulate protective glass composition and come into contact with outer glass shell 12, producing the undesirable reaction which the present process is designed to avoid. Accordingly, it is important to the process of the present invention that the protective glass composition 18 have a flow temperature not greater than the melting point of reactive metal rod 10.

Another important property of the protective glass compositions used in the process of this invention, is that they be compatible with beryllium, or the other reactive metal used, so that the fiber core-casting process can be effectively carried out.

While it is not necessary that the protective glass composition be completely unreactive with the molten reactive metals, it must be substantially unreactive, or sufficiently unreactive to allow the desired metal filaments to form within the protective glass layer of the glass-metal composite. This degree of unreactivity is defined herein as "compatibility" of the protective glass with the molten reactive metal. The inclusion of at least about 12 mol percent of beryllium oxide (BeO) in the protective glass composition advantageously reduces the reactivity of the protective glass and allows the achievement of the desired compatibility of the protective glass with molten beryllium.

It is, of course, necessary that the protective glass composition contain sufficient silica ($SiO_2$) to have glass forming properties. The protective glass composition thus contains silica as its glass forming ingredient, beryllium oxide as its primary protective ingredient, and fluxing agents designed to soften the overall protective glass composition so that it will flow at a temperature not greater than the melting point of beryllium.

The presence of such softening or fluxing agents in the protective glass composition is necessary because of the extremely high melting temperature of beryllium oxide. Without these fluxing agents, the protective glass composition would have to be heated to a temperature of about 1800 to 1900° C. before it would flow in the desired manner; and therefore it would not flow prior to or along with the beryllium rod and would not provide the required protective layer.

To achieve the desired results, it has been found advantageous to provide a protective glass composition containing at least about 50 mol percent (and preferably 52 to 60 mol percent) silica, about 12 to 30 mol percent beryllium oxide, and the balance metal oxide fluxing agents.

The preferred fluxing agents of the protective glass composition used in the process of this invention are the alkali metal oxides, such as lithium oxide ($Li_2O$), sodium oxide ($Na_2O$) potassium oxide ($K_2O$) and cesium oxide ($Cs_2O$). These alkali metal oxides are strong fluxing agents, and are particularly effective in softening the overall composition so that it will flow at a temperature less than the melting point of beryllium.

In addition to acting as fluxing agents, the alkali metal oxides are also highly stable, and are not readily reduced by the molten reactive metals. The alkali metal oxides thus supplement the protective action of the beryllium oxide in the protective glass composition.

To achieve these purposes, it has been found desirable to include one or more alkali metal oxides in the protective glass composition in an aggregate amount of about 5 to 15 mol percent of the composition. The preferred alkali metal oxide is lithium oxide, and it is preferably included in the composition in the amount of about 12 mol percent.

Up to 45 mol percent, in aggregate, of beryllium oxide and alkali metal oxide can be included in the protective glass composition. It has been found to be advantageous, however, to limit the total aggregate amount of these ingredients to not more than 42 mol percent of the total composition, because of the tendencies of both beryllium oxide and the alkali metal oxides to cause the glass to crystallize. Thus, an inferior protective glass may result if the aggregate amount of beryllium oxide and alkali metal oxide in the composition exceeds about 42 mol percent.

Additional fluxing agents which can be used in the protective glass composition of this invention are the stable metal oxides, such as barium oxide (BaO), magnesia (MgO), calcium oxide (CaO) and alumina ($Al_2O_3$); and the alkaline earth metal fluorides, such as calcium fluoride ($CaF_2$) and magnesium fluoride ($MgF_2$).

The stable alkali metal oxides, and particularly magnesia and calcium oxide are preferred supplemental fluxing agents. While these stable metal oxides are optional fluxing agents, they are preferably present in the protective glass composition in amounts up to about 15 mol percent. These stable metal oxides not only serve as supplemental fluxing agents, but, because they have a lower reactivity with molten beryllium than that of silica, they also enhance the insulating action of the protective glass composition.

When the alkaline earth metal fluoride optional fluxing agents are used in the protective glass compositions, they can be present in amounts from about 0 to 5 mol percent of the composition.

Preferred protective glass compositions which are most advantageously used in the process of the present invention comprise:

|  | Mol percent |
| --- | --- |
| Silica | 52–60 |
| Beryllium oxide | 12–30 |
| Lithium oxide | 5–15 |
| Mixture of calcium oxide and magnesia | 0–15 |

In accordance with the invention the glass-beryllium composite is heated to the fiberization temperature of the outer glass tubing 12, as shown in the drawing. This fiberization temperature is above the melting point of the beryllium metal rod 10 and above the flow temperature of the protective glass composition 18, and hence causes both the beryllium and the protective glass to flow. The outer glass tubing softens during this heating and is drawn into a fiber of the desired size, with the powdered protective glass becoming fluid and surrounding the beryllium as the latter is melted and flows into the core of the glass fiber.

As shown in the drawing, the glass-protective glass-beryllium composite is preferably lowered into the fiberizing furnace 14 by feeding mechanism 20 located vertically above the furnace. When the process is initially started, the lower end of open glass tubing 12 is closed by heating and the beryllium rod or wire 10 is inserted only part of the way down the tubing 12. This allows the process to get under way by producing a length of plain glass, before the initial production of the glass-metal composite begins.

Furnace 14 contains an open portion, as shown schematically in the drawing, through which the glass-metal composite can be passed for the desired heating. Any type of glass fiber furnace such as an open or partially closed induction furnace can be used to achieve the desired heating. The temperature to which the composite is heated in furnace 14, of course, depends on the fiberization temperature of the particular glass tubing being used in the process. By way of example, the composite may be heated to temperatures of from about 1300° C. to above 2000° C. When the preferred Vycor high temperature glass tubing is used, the composite is heated to a temperature of about 1900° C.

When the fiberization temperature of the outer glass shell 12 is reached in furnace 14, the process is continued by drawing the heated glass tubing to form a continuous glass fiber 16 containing a core of filamentary beryllium. The molten beryllium is insulated from the outer glass shell of the fiber during the drawing step by a layer of fluid, molten protective glass.

The composite glass-metal fiber 16 shown in the drawing is preferably produced by drawing the heated glass tubing with a conventional drawing drum after the tubing has reached its fiberization temperature and become suitably softened. The speed at which this drawing step is carried out can be varied to produce composite fibers of varying sizes, and thus the particular drawing speed selected depends on the fiber size desired. Generally drawing speeds of about 100 to 300 feet per minute are used.

Although the present process should be useful in producing reactive metal filaments of any desired size, beryllium fibers having a diameter of about 0.001 to 0.004 inch are presently considered most desirable and useful.

In summary, the process of this invention is designed to produce reactive metal fibers by continuously casting such fibers as the core of a glass-metal composite fiber. The utilization of this glass core-casting process in the production of the reactive metal filaments or fibers of this invention is achieved by providing a barrier layer between the molten reactive metal core and the outer glass shell during filament formation. This protective layer comprises a glass composition which is less reactive than conventional glass compositions with molten reactive metals, such as beryllium.

The principle of this protective mechanism is the incorporation in the intermediate glass layer of substantial amounts of stable metal oxides which are not readily reduced by molten beryllium, and hence protect the outer silica glass from reaction with the molten beryllium. The protective glass composition becomes fluid at or below the melting point of beryllium so that the reactive molten beryllium is always surrounded by a continuous film of the protective glass at the time of fiber formation.

For a clearer understanding of the invention, specific examples of it are set forth below. These examples are merely illustrative and are not to be understood as limiting the scope and underlying principles of the invention in any way.

Example 1

A length of high temperature Vycor glass tubing having a nominal diameter of 0.200 inch (I.D. of 0.06 and O.D. of 0.200) is heated at its lower end in a torch flame, to close one end of the tube.

A high purity beryllium wire having a nominal diameter of 0.030 inch is inserted into the glass tubing to a point about 3 inches above the closed lower end of the tubing; and a particulate protective glass composition is then packed into the tube surrounding the beryllium rod by gravity packing, to completely fill the empty space between the beryllium rod and the glass tubing.

The protective glass composition which is used in this example contains 58.9 mol percent silica, 19.7 mol percent beryllium oxide, 11.9 mol percent lithium oxide, 4.0 mol percent calcium oxide and 5.5 mol percent magnesia.

The glass-protective glass-metal composite is then attached to a vertical feeding mechanism and positioned so that the closed end of the tube is in the hot zone of an open induction-heated fiberizing furnace at a temperature of about 1900–2000° C. When the outer glass tubing reaches its fiberization temperature (about 1900° C.) and softens sufficiently, a fiber is drawn from its lower end and attached to a conventional fiber drawing or winding drum, rotating at a speed of 178 feet per minute. The composite is pulled out of the furnace and into a glass-beryllium fiber having a nominal diameter of .008 inch. This composite fiber contains a beryllium filament having a nominal diameter of about .002 inch, as its core.

As soon as the fiberizing process is started, the specimen feeding mechanism is activated so that new composite is continuously fed to the furnace at a rate of 0.65 inch per minute. The protective glass becomes fluid and the beryllium melts as they approach the fiberizing zone.

The beryllium fiber product is wound onto a suitable roll for storage or shipment, either with or without prior removal of the outer glass and protective glass layers. The beryllium fiber product is suitable for use as a metal or resin structural reinforcing material.

Example 2

The procedure of Example 1 is duplicated in this example except that the protective glass composition used in this example comprises 59.2% $SiO_2$, 19.2% BeO, 12.0% $Li_2O$, 8.0% CaO, and 1.6% $Al_2O_3$. (All percentages are mol percent.) The resulting product is substantially similar to that which is produced in Example 1.

Example 3

The procedure of Example 1 is duplicated in this example except that the protective glass composition used in this example comprises 54.2% $SiO_2$, 24.2% BeO, 11.9% $Li_2O$, 4.0% CaO and 5.5% MgO. (All percentages are mol percent.) The resulting product is substantially similar to that which is produced in Example 1.

Example 4

The procedure of Example 1 is duplicated in this example except that the protective glass composition used in this example comprises 60.6% $SiO_2$, 12.8% BeO, 12.0% $Li_2O$, 8.0% CaO and 6.6% $Al_2O_3$. (All percentages are mol percent.) The resulting product is substantially similar to that which is produced in Example 1.

What is claimed is:

1. A process for the preparation of beryllium fibers which comprises inserting beryllium in a glass tube; surrounding the beryllium with a protective glass composition which contains at least 50 mol percent silica, 12 to 30 mol percent beryllium oxide, and the balance essentially metal fluxing agents which act to soften the protective glass composition to cause it to flow at a temperature not greater than the melting point of beryllium, said protective glass composition being substantially unreactive with beryllium and having a flow temperature not greater than the melting point of beryllium; heating the glass-beryllium composite to the fiberizing temperature of the outer glass tubing, said fiberizing temperature being above the melting point of the beryllium and above the flow temperature of the protective glass composition; and drawing the heated glass tubing into a continuous glass fiber which contains as its core a continuous beryllium filament.

2. The process of claim 1, in which the protective glass compositoin comprises:

| | Mol percent |
|---|---|
| Silica | 50 |
| Beryllium oxide | 12–30 |
| At least one alkali metal oxide | 5–15 |
| At least one metal oxide selected from the group consisting of barium oxide, magnesia, calcium oxide and alumina | 0–15 |
| At least one alkaline earth metal fluoride | 0–5 |

3. The process of claim 1, in which the protective glass composition comprises:

| | Mol percent |
|---|---|
| Silica | 52–60 |
| Beryllium oxide | 12–30 |
| Lithium oxide | 5–15 |
| Mixture of calcium oxide and magnesia | 0–15 |

4. The process of claim 1, in which the fiberizing temperature of the glass tubing is at least about 1900° C.

5. The process of claim 1, in which the beryllium-glass composite is heated to the fiberizing temperature of the outer glass tubing by passing the composite through an open furnace.

6. The process of claim 5, in which the heated composite is drawn out of said open furnace by a winding drum rotating at a speed of about 100 to 300 feet per minute.

7. A composite glass-beryllium fiber product comprising a continuous outer glass fiber having a continuous beryllium filament disposed within it as its core and a layer of a protective glass composition disposed between said outer glass fiber and said beryllium core, the protective glass composition containing at least 50 mol percent silica, 12 to 30 mol percent beryllium oxide, and balance essentially metal fluxing agents which act to soften the protective glass composition to cause it to flow at a temperature not greater than the melting point of beryllium.

8. The product of claim 7 in which the protective glass composition comprises:

| | Mol percent |
|---|---|
| Silica | 50 |
| Beryllium oxide | 12–30 |
| At least one alkali metal oxide | 5–15 |
| At least one metal oxide selected from the group consisting of barium oxide, magnesia, calcium oxide and alumina | 0–15 |
| At least one alkaline earth metal fluoride | 0–5 |

9. The product of claim 7 in which the protective glass composition comprises:

| | Mol percent |
|---|---|
| Silica | 52–60 |
| Beryllium oxide | 12–30 |
| Lithium oxide | 5–15 |
| A mixture of calcium oxide and magnesia | 0–15 |

References Cited

UNITED STATES PATENTS 3,214,805  11/1965  McKencia _____ 29—423 X
3,261,676   7/1966  Morelock _____ 65—18

S. LEON BASHORE, Primary Examiner

ROBERT L. LINDSAY, Assistant Examiner

U.S. Cl. X.R.

29—419; 65—2, 13; 72—46; 117—70; 164—50, 82, 128

PO-1050
(5/69)

UNITED STATES PATENT OFFICE
CERTIFICATE OF CORRECTION

Patent No. 3,483,072          Dated December 9, 1969

Inventor(s) J. E. Cox et al

It is certified that error appears in the above-identified patent and that said Letters Patent are hereby corrected as shown below:

Claim 2, column 7, line 62, change "compositoin" to -- composition --;

Claim 2, column 7, line 64, before "50" insert -- at least --.

Claim 8, column 8, line 38, before "50" insert -- at least --.

SIGNED AND SEALED
MAY 26 1970

(SEAL)
Attest:

Edward M. Fletcher, Jr.
Attesting Officer

WILLIAM E. SCHUYLER, JR.
Commissioner of Patents